United States Patent
Balinsky

(10) Patent No.: US 7,203,902 B2
(45) Date of Patent: Apr. 10, 2007

(54) METHOD AND APPARATUS FOR DOCUMENT COMPOSITION

(75) Inventor: Helen Balinsky, Cyncoed Cardiff (GB)

(73) Assignee: Hewlett-Packard Development Company, L.P., Houston, TX (US)

(*) Notice: Subject to any disclaimer, the term of this patent is extended or adjusted under 35 U.S.C. 154(b) by 350 days.

(21) Appl. No.: 10/896,994

(22) Filed: Jul. 23, 2004

(65) Prior Publication Data

US 2005/0076290 A1    Apr. 7, 2005

(30) Foreign Application Priority Data

Jul. 24, 2003    (GB) ................. 0317303.6

(51) Int. Cl.
G06F 17/00    (2006.01)

(52) U.S. Cl. .................................... 715/517
(58) Field of Classification Search ................. 715/517
See application file for complete search history.

(56) References Cited

U.S. PATENT DOCUMENTS

| | | | |
|---|---|---|---|
| 5,459,827 A * | 10/1995 | Allouche et al. ........... 715/513 |
| 5,499,366 A * | 3/1996 | Rosenberg et al. ............ 707/4 |
| 5,742,837 A | 4/1998 | Fukui et al. |
| 6,826,727 B1 * | 11/2004 | Mohr et al. .................. 715/517 |
| 2003/0040926 A1 * | 2/2003 | Milton ........................... 705/1 |
| 2005/0055635 A1 * | 3/2005 | Bargeron et al. ........... 715/525 |
| 2005/0172278 A1 * | 8/2005 | Kuch et al. .................. 717/158 |

FOREIGN PATENT DOCUMENTS

| EP | 097410201 | 1/2000 |
|---|---|---|
| WO | WO 02/17126 | 2/2002 |

* cited by examiner

Primary Examiner—Stephen Hong
Assistant Examiner—Adam Queler
(74) Attorney, Agent, or Firm—Foley & Lardner LLP

(57) ABSTRACT

A method of composing a document is disclosed which comprises defining a plurality of content portions to be fitted to the document, defining a content layout for the document, which defines at least two containers into which content portions are to be fitted, generating a first set of solutions for a first one of the containers, each comprising a combination of content, which fit within the container in accordance with one or more rules, generating a second set of solutions for a second one of the containers, each comprising a combination of content which fit within the second container in accordance with one or more rules, and referencing the first set with the second set to determine an allowable combination of solutions which fit the first and second containers in which all of the contents in the solution for the first container differ from the contents in the solution for the second container.

14 Claims, 8 Drawing Sheets

METHOD AND APPARATUS FOR DOCUMENT COMPOSITION

FIELD OF THE INVENTION

This invention relates to page composition for documents, and in particular, but not exclusively to a method of composing a highly customised document.

BACKGROUND OF THE INVENTION

There are many instances in which an author produces a document by fitting multiple content portions onto a page, or multiple pages, of a document. The content portions are typically set out on the page within predefined regions or areas which contributes to the style of the document, possibly making it more aesthetically pleasing by minimising alignment lines or perhaps making the document easier to read by providing a sequence for the eye to follow. For example, most brochures or catalogues will include content portions which are fitted to containers that define rows and or columns. The number of rows or columns and their location will be fixed during authoring to give the page a coherent appearance when viewed alongside other pages of the brochure or maybe just to make each page different.

It is known to provide tools for the automatic composition of a page or part of a page of a document. A typical tool will take as its inputs a set of content portions and a document to which they are to be fitted together with a set of rules which may be associated with the document. An example of a rule is that the maximum amount of content possible should be fitted to the page. Another may be that no one content portion may be shown more than once on a page of the document. The composition tool usually tries to fit the content portions into the document as best it can, maximising the amount of contents portions fitted yet conforming to the rules associated with the document.

Examples of typical documents that are set out in this way are sales catalogues, brochures and advertising pamphlets. Content portions could take many forms, perhaps an image or a graphic or a rectangular block of text or a combination of these. They may comprise sale items.

The task of fitting content portions to a document is complex when the shape and size of the content portions vary. There may be many possible ways in which the content portions can be fitted to the document. However, of these perhaps only one or no solutions may obey the rules associated with the document. In the past this has required trial and error by the author, which is time consuming.

SUMMARY OF THE INVENTION

According to a first aspect the invention provides a method of composing a document comprising:
  defining a plurality of content portions to be fitted to the document;
  defining a content layout for the document, which defines at least two containers into which content portions are to be fitted;
  generating a first set of solutions for a first one of the containers, each comprising a combination of content, which fit within the container in accordance with one or more rules;
  generating a second set of solutions for a second one of the containers, each comprising a combination of content which fit within the second container in accordance with one or more rules;
  and referencing the first set with the second set to determine an allowable combination of solutions which fit the first and second containers in which all of the contents in the solution for the first container differ from the contents in the solution for the second container.

The document may comprise one or more pages, with content being fitted to one page, across more than one page, or perhaps to just part of one page.

Defining containers for the content enables the method to apply aesthetic rules during the composition of the page, or part of the page, since the containers provide control over the page layout. A suitable container may define a row or a column to which content is fitted.

The method may be repeated with an alternative set of content portions. For example, it may be repeated with some of the content portions omitted or with one or more of the content portions modified or divided. The content portions could be scaled perhaps, or split into two smaller content portions.

Where no allowable solutions can be found in this way, the method may include a step of selecting an alternative content layout in the event that the content does not form an allowable solution. This will arise if there is no solution which meets the rules set for the composition of the page, e.g. if all the content will not fit on the page. This may be repeated until an allowable solution is found.

The method may comprise selecting a content layout and/or content portions from a predefined selection. Alternatively, the content layout may be generated according to one or more known properties of the document. A typical property may be the knowledge that content cannot be fitted to one or more reserved areas of the document which contain static content, such as a header or a footer portion.

The method may be performed automatically by a processor. The layout and content portions may be stored in a memory accessible by the processor. This could be a local memory or perhaps a memory which can be accessed across a network.

The method may comprise the step of generating the first solution set by determining all possible combinations of content portions from a predefined set of content portions which satisfy the one or more rules for filling the first container.

The or each rule include:
  excluding content portions which extend beyond the boundaries of the first container;
  leaving a minimum acceptable area of the container unfilled;
  avoiding unauthorised overlap of content portions;
  avoiding duplication of content portions within a personalised copy of a document.

The method may comprise generating a solution of the first solution set by selecting a first content portion from the predefined selection, checking that the content portion satisfies the rule or rules associated with the first container and adding the content portion to a temporary solution set. This may be repeated by selecting a different content portion from the predefined set and continuing to add them to the temporary solution set until the container is full. It may be considered full if the amount of space left is less than a predefined amount set out by the rules for the container.

The method may apply a "smart tree" search strategy to select all the possible solutions for the container. The use of a smart tree allows all possible solutions to be found without the need to test every possible combination. By smart tree we may mean allocating a number to each of N selection portions, defining a tree structure which has a root comprising a first content portion and having N-1 branches extending therefrom. Each branch from the root corresponds to a respective one of the N-1 remaining content portions in the set. The end of each branch from the root similarly has k-1 branches extending from it where k is the number of the content portion at that node, and each branch corresponding to a respective one of the content portions numbered higher than k. The method may then determine allowable selections by starting at the root and working downwards along a branch until the rules for the container to which content portions are being fitted are broken. At that point the remainder of the branch is removed from the search and the search goes back up the tree and continues down a different branch and so on. This is performed starting at the root of the tree and all of its first generation children and is known as a depth first search strategy.

Of course, the method may employ many different search strategies to determine the allowable selections of content for a container.

The method may generate the second solution set in the same or a similar way.

The method may comprise storing the content layout and the document in a first area of machine readable memory accessible to a processor, causing the processor to access the content portions and the content layout from the memory so as to generate the first and second solution sets and storing the generated solution sets in a second area of machine readable memory.

The method may also cause the processor to access the stored solutions from the second area of memory and process the solutions to determine the allowable solutions before writing the allowable solutions to a third area of machine readable memory.

The method may generate solutions which comprise an array of binary data, an entry in the array corresponding to each of the content portions in the predefined selection of content portions and each having a first value in the corresponding content portion is present in the solution and a second value if it is not present within the solution represented by the array. The binary values may comprise zero and one.

The method may be adapted to reference the first solution set with the second solution set by performing a logical bitwise AND operation on the binary data defining each possible combination of first and second solutions and identifying combinations in which the result of the logical bitwise AND operation is zero. The result will only be zero if there are no common content portions in a combination.

A convenient way of performing the logical bitwise AND operation is to generate a matrix for the set of solutions for the first container, each row in the matrix corresponding to a different solution from the solution set and each column corresponding to one of the possible content portions. A similar matrix may be generated for the set of solutions for the second container. One of the matrices may then be transposed and the matrix product determined, allowable combinations then being apparent from the values of the elements in the matrix product. For example using binary ones and zeros any zeros in the matrix product will indicate allowable combinations.

This can readily be extended to the case of content layouts which include more than two containers. In that case, the method may reference matrices for the first and second solution sets to determine allowable combinations. A one dimensional matrix is then produced for every allowable combination in which each entry in the one dimensional matrix comprises a binary value which corresponds to one of the content portions in the predetermined selection, with a first binary value being assigned if a content portion is used in the allowable combination and a second value if it is still free for use. If more than one allowable combination is generated, a one dimensional matrix may be formed for each allowable solution. This operation could be performed as a logical bitwise OR operation.

The one dimensional matrices may be fitted to a new two dimensional matrix and this may be processed with a matrix for the third solution set. The apparatus may continue this until a final allowable solution is found for all of the containers.

It is possible to accelerate the process of finding allowable solutions where there are multiple containers. In this case, parts of the method may be performed in parallel. The method may find solutions for containers in parallel, or perhaps process pairs of solution sets in parallel to determine whether or not allowable solutions exist, and then process pairs of the resulting matrices and so on. If one pair produces a failure (i.e. no compatible solutions exist) the process can be stopped.

The method may produce all possible pairs of containers and process the corresponding pairs of solution sets in parallel.

A further increase in speed can be obtained if there are two or more identical containers. In this case, the solution set for one container can be used as the solution set for the other similar container. Also, multiplying together the matrices for the two containers with identical solutions produces a symmetrical matrix allowing only one half of the matrix to be searched to identify allowable combinations.

Rather than multiplying matrices it will be appreciated that pairs of solutions selected from the solution sets may be directly compared to identify allowable combinations. This can again be performed in parallel to reduce the amount of computation needed to arrive at allowable combinations.

The step of defining the content portions to be fitted to the page may comprise selecting content portions from a plurality of content portions.

According to a second aspect the invention provides an apparatus for the composition of a document by fitting a selection of content portions into the document comprising:
    a content layout generator for the generation of a content layout including at least two containers to which content portions are to be fitted;
    a solution set generator arranged to generate a first set of solutions for the first container, each solution comprising a combination of content portions which fit within the first container in accordance with one or more rules, and a second set of solutions for the second container, each solution comprising a combination of content portions which fit within the container in accordance with one or more rules; and
    a referencer arranged to reference the first set with the second set to determine an allowable combination of solutions for the first and second containers in which all of the content portions in the solution for the first container of the allowable combination differ from the content portions in the solution for the second container.

The solution set generator and the referencer may be embodied by a processing means, such as a microprocessor and program instructions, which may be executed by the processing means.

According to a third aspect the invention provides a data carrier having a computer program thereon which when running on a processor causes the processor to perform the method of the first aspect of the invention or provide the apparatus of the second aspect of the invention.

BRIEF DESCRIPTION OF THE DRAWING

There will now be described, by way of example only, one embodiment of the present invention with reference to the accompanying drawings of which.

DETAILED DESCRIPTION OF THE PREFERRED EMBODIMENTS

This particular invention is applicable to the automatic composition of a page or multiple pages or a part of a page of a document. Generally the document to be composed will be produced by fitting a set of content "portions" or "elements" stored in an electronic format in an electronic memory into a document also stored electronically in a portion of memory. The document may start off as a blank document or may already have some content fitted to it—such as a header and footer or perhaps a table or other static content in the middle of the document. The final document may be viewed on a display or, more likely, printed onto a media such as paper as a hard copy. An example of a set of content portions 401–408 is given in FIG. 4 of the accompanying drawings. Four examples of different container layouts 501–504 are given in FIGS. 5(a) to (d).

The composition of documents is a time consuming task, which is made more time consuming if the documents are to be customised to a reader. The first step is to determine what the document is to contain. The document may, for example, be a holiday brochure, which is customised so as to contain information, which matches the interests of the reader. In this case, a set of customised content portions is generated for that user from a global set of content. The content items are a selection of viewable or printable two-dimensional elements relating to holidays: these may be pictures or text descriptions. Each content item may be tagged with a description indicating their relevance to a particular keyword. The significance of the keywords for the intended reader is determined by direct polling of the recipient, perhaps by analysing the recipients previous holidays or by studying information that the recipient has previously read.

Once a group of content is selected it is next fitted to the document. For a multi-page document it is subdivided into content for each page, or perhaps for sub-regions of a single page of the document.

In the next step, the content is fitted to the document. This can be performed manually or automatically.

Figure 1:
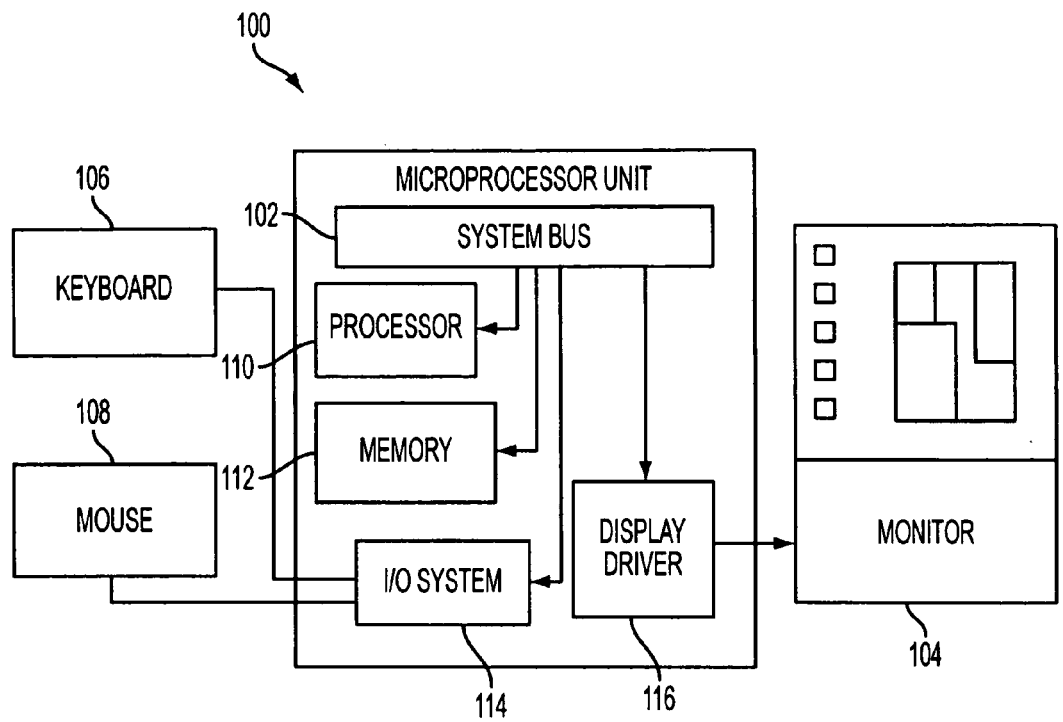
FIG. 1 is an overview of an apparatus in accordance with a first aspect of the invention.

In the example described hereinafter an apparatus for the automatic composition of a document is described with reference to FIGS. 1 and 2 of the accompanying drawings. The apparatus 100 comprises a processing means in the form of a microprocessor unit connected to peripheral devices including a display means such as a monitor 104 and input devices which in this example comprise a keyboard 106 and a mouse 108. More specifically the microprocessor unit 110 further comprises a housing for a central processing unit (CPU) 110, a display driver 116, memory 112 (RAM and ROM and optionally a hard disk drive) and an I/O subsystem 114 which all communicate with one another, as is known in the art, via a system bus 102. The processing unit 110 comprises an INTEL PENTIUM series processor, running at typically between 900 MHZ and 1.7 GHZ.

As is known in the art the memory 112 may include a ROM portion that contains the Basic Input Output System (BIOS) that controls basic hardware functionality. The RAM portion of memory 112 is a volatile memory used to hold instructions that are being executed, such as program code, etc.

The apparatus 100 could have the architecture known as a PC, originally based in the IBM specification, but could equally have other architectures. The server may be an APPLE, or may be a RISC system, and may run a variety of operating systems (perhaps HP-UX, LINUX, UNIX, MICROSOFT NT, AIX or the like).

Figure 2:
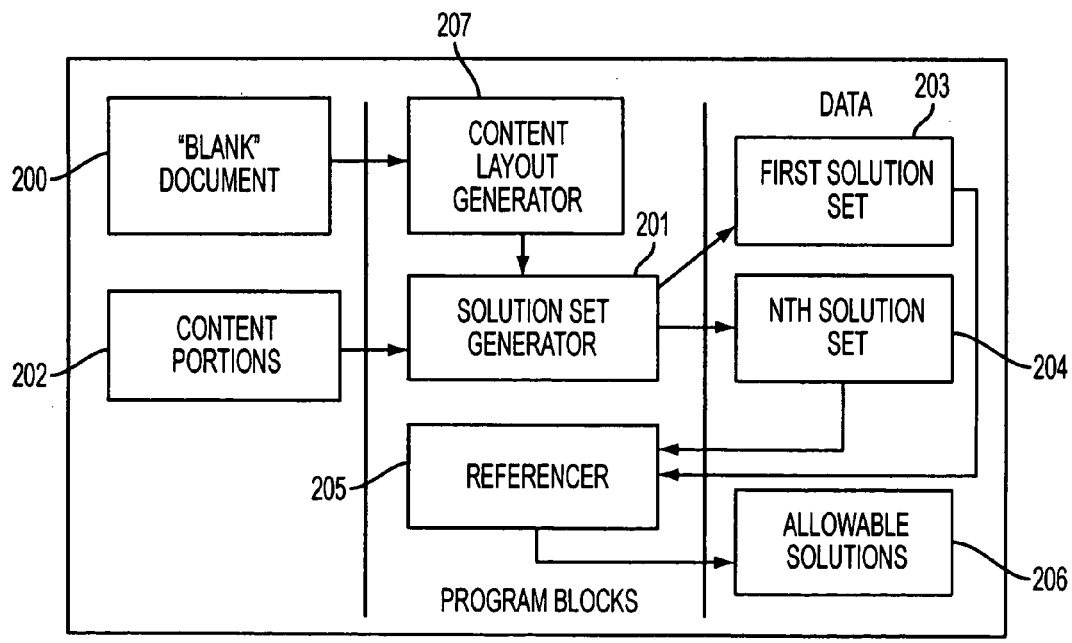
FIG. 2 is detailed view of a part of the contents of the memory of the apparatus of FIG. 1.

As shown in FIG. 2 of the accompanying drawings, document content data defining a set of content portions 202 is held on the apparatus 100 in a first portion of the memory 112. A "blank" document 200 is stored in a second portion of memory 112. By blank we mean a document which has not yet had the content fitted although it may already carry some prefitted information such as a title or a footer. The document may be entered into the memory by capturing an image of a document template using a scanner. Alternatively, the document may be created in an electronic format using a suitable authoring tool running on the processor. The apparatus prompts a user to provide a document and a set of content to be fitted to the document if they are not already available in the memory.

A computer program comprising a set of program instructions is also stored in the memory 112 which when running instructs the processor 110 to process the data defining the content together with the blank document to determine ways in which the content can be fitted to the document. The input devices permit the user to control the operation of the program and hence the processor. This allows the user to add more content, delete content, change content or change the layout of the blank document.

The computer program comprises three main functional blocks of program data, each of which when executed by the processor cause the processor to perform various functions in manipulating the document content data stored in the memory. During the manipulation intermediate data is produced, including solution sets 203,204 of content portions which are stored at least temporarily within the memory. These program blocks and the data can be seen in the block diagram of FIG. 2 of the accompanying drawings and can be summarised as a content layout generator block 207, a solution set generator block 201 and a referencer block 205.

Of course, the reader will readily appreciate the description of blocks of data in the memory is purely conceptual and that in practice the program may be stored as many fragments of data distributed across portions of the memory.

Figure 3:
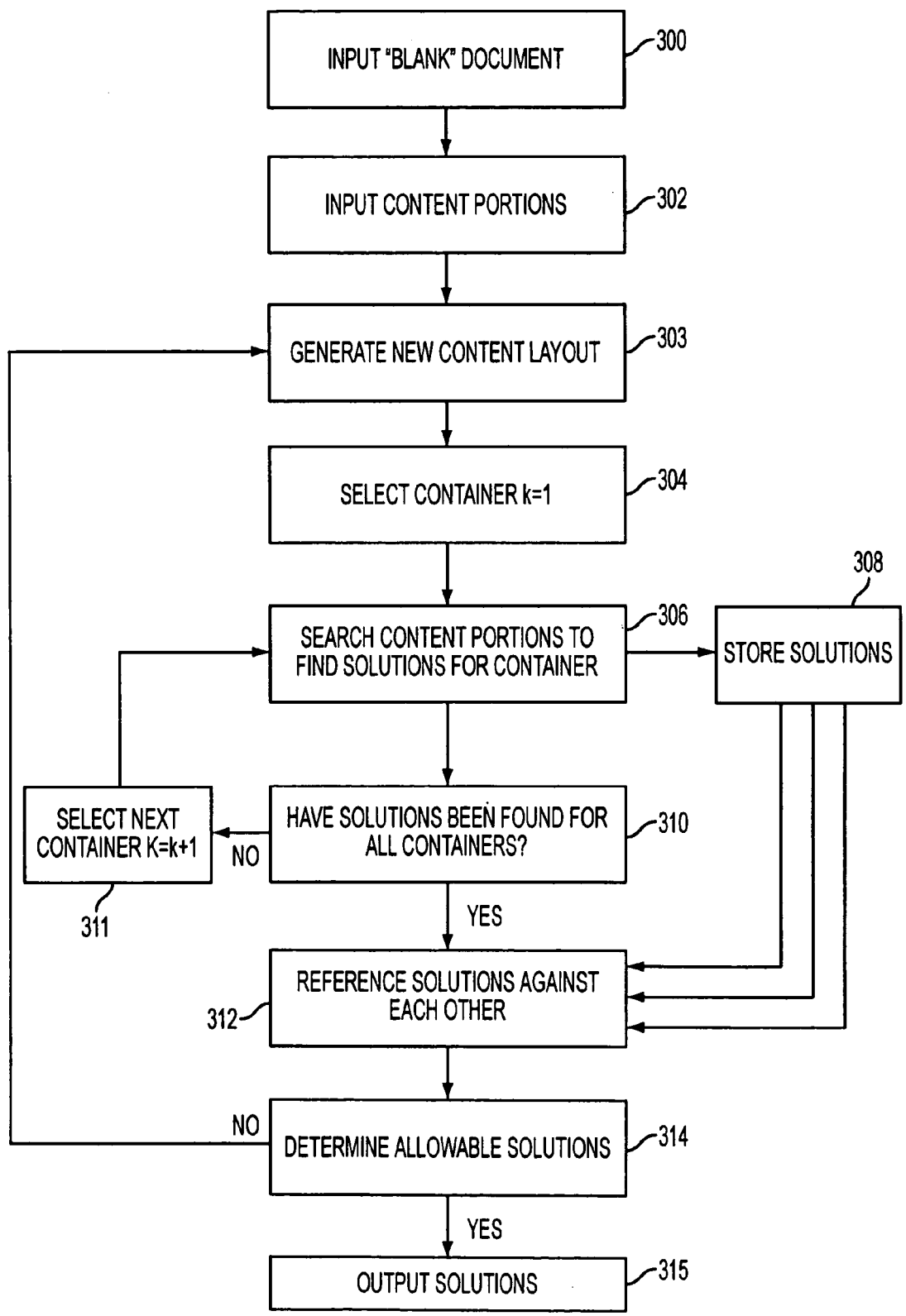
FIG. 3 is a flow chart of the method steps performed in fitting content portions into containers defined by a document layout template.
Figure 5A:
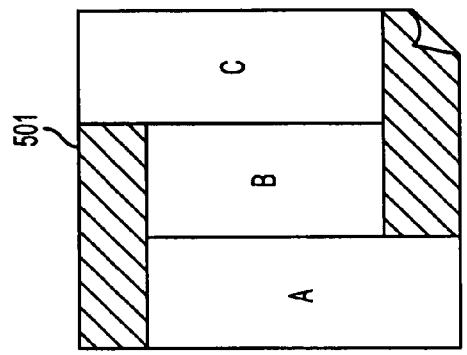
FIG. 5(a) to (d) are four different document content layouts which each contain three or four containers for content portions.
Figure 5B:
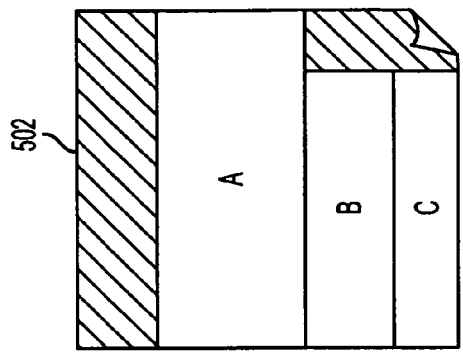
Figure 5C:
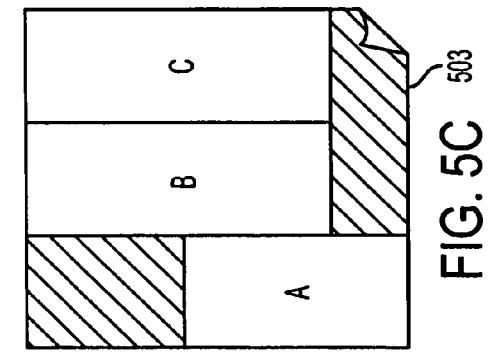
Figure 5D:
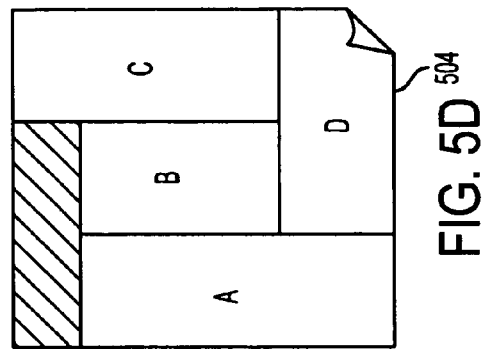

The sequence of operational steps performed by the processor when executing the blocks of program data stored in the memory can best be understood by reference to the flow chart of FIG. 3.

Figure 4:
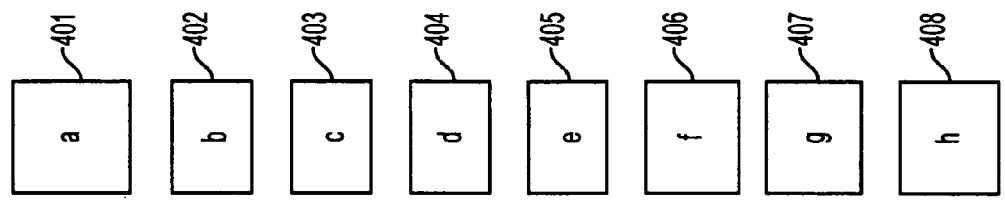
FIG. 4 is an example of a universal set of content portions.

In a first step, a user is requested to input 300 a blank document 200. The document input by the user is stored in the memory. The user is also requested to input 202 a universal set of content portions or information about the content portions, such as where they are stored, their identity and properties including length and width. These may be text boxes of defined height and width and any alternatives. FIG. 4 illustrates a typical set of eight content portions, all of the same width but differing lengths. For convenience they have been labelled with an identifying letter form "a" to "h", although it is more convenient for the processor to allocate a number to each content portion from x=0 to N where N is the total number of content portions.

Having received the document and the content portions the processor or the user next defines 303 a content layout for the document. The layout comprises multiple "containers" or "zones"—typically 2 to 8 or more, and defines the position of the containers in the document, their length and width. FIGS. 5(*a*) to (*d*) are four examples of different containers A,B,C and optionally D within a document. This layout provides control of the appearance of the final composed document. In this example lets assume that a content layout with four containers is selected.

In the next step, the processor selects 304 a first container defined by the content layout and searches 306 all of the content portions in the universal set in order to find possible solutions for a first of the containers. Each solution comprises a dataset of binary values—one value for each content portion in the set. The value is set to zero if the content portion is not present in an allowable solution and unity if it is present. Any solutions that are found are stored 308 in the memory to form a first solution set.

Figure 6:
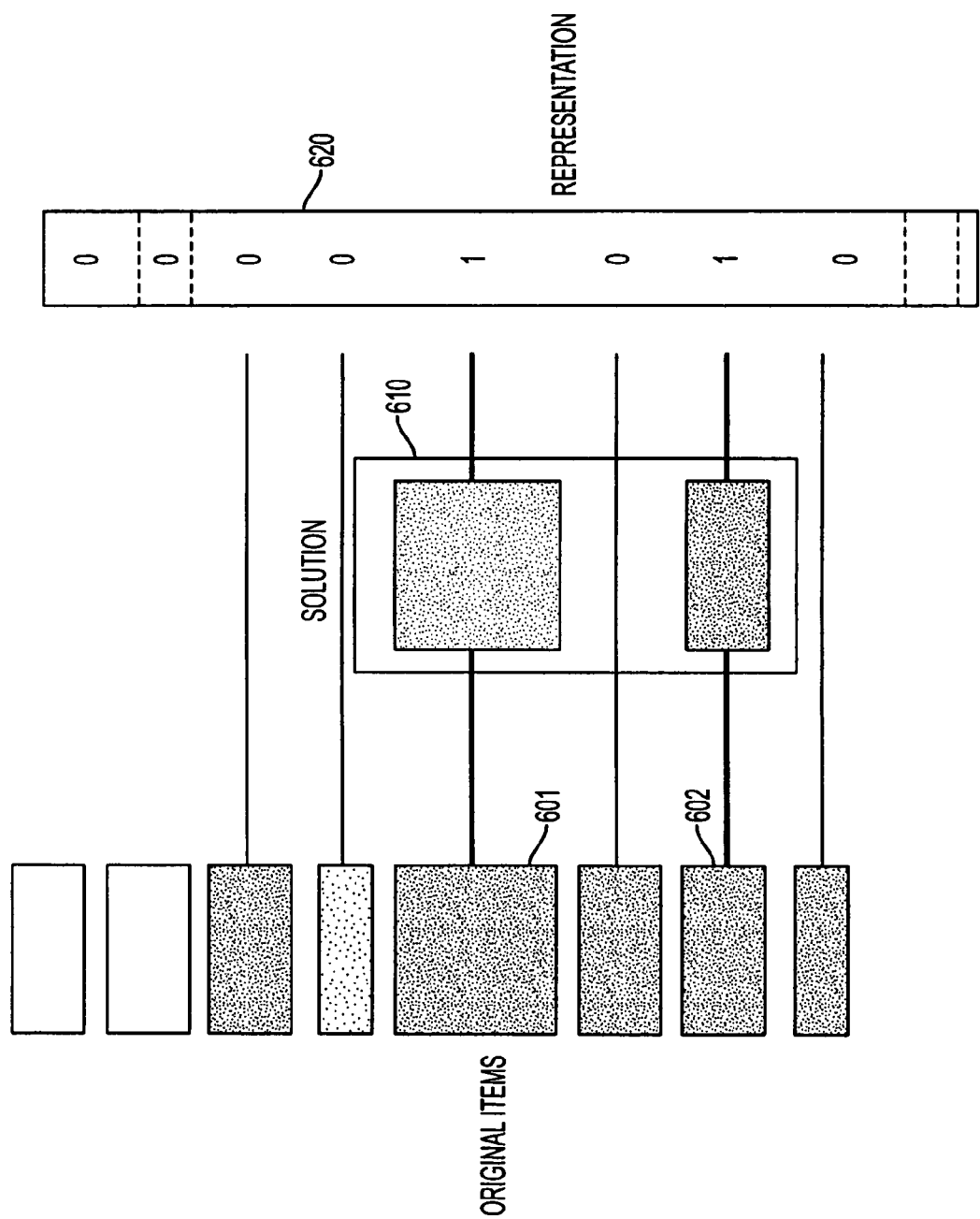
FIG. 6 is a conceptual illustration of the generation of a solution for a container as a binary string.

The format of a solution can best be understood with reference to FIG. 6 of the accompanying drawings. In this case content portions (or "elements") 601 and 602 provide a solution (or "combination") 610 for a container which can be defined as an array 620 of the form (0,0,0,0,1,0,1,0). Note that the array is a string of length N where N is the number of content portions in the universal set.

The processor decides whether or not a combination can fit within a container in accordance with rules associated with the container. In this example only two rules are applied: that the total length of the content portions must not exceed the length of the container and that the total length of the container must not exceed the total length of the contents by any more than a predefined amount. In other words the container should be as full as can be without the contents portions spilling out of the container or having to overlap.

Figure 9A:
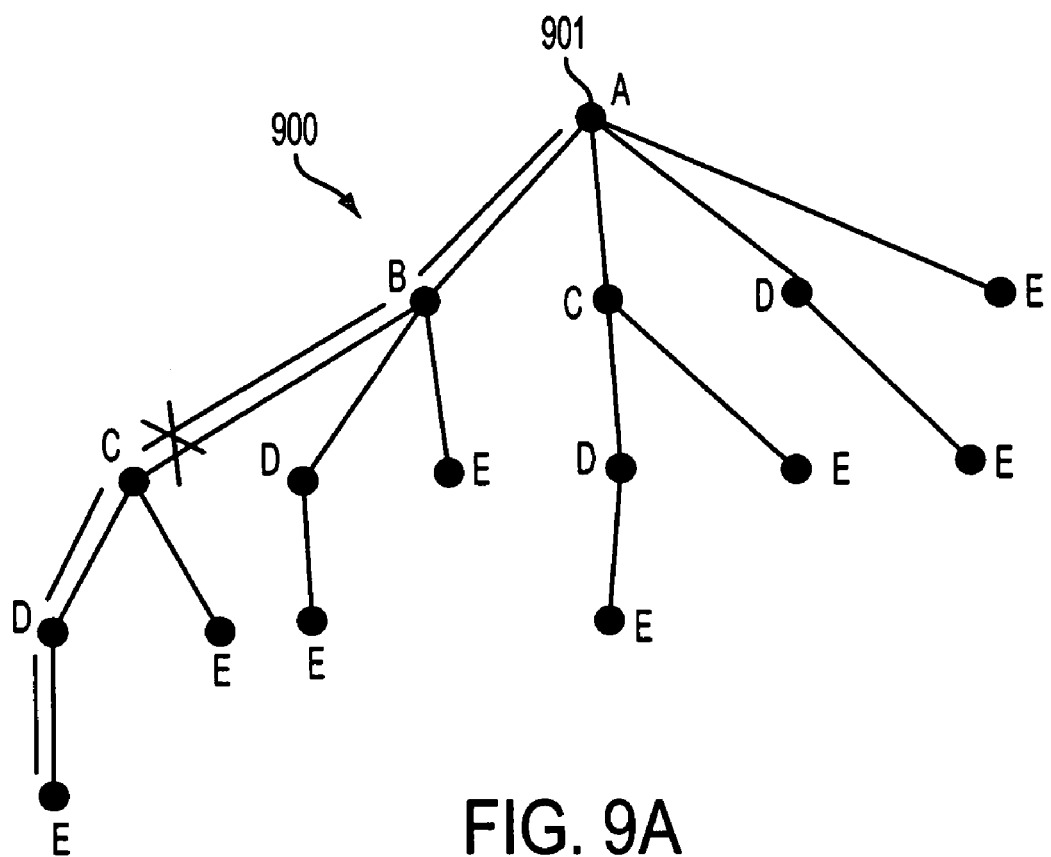
FIG. 9 is an example of a smart tree used in a search strategy for identifying solutions for a container.
Figure 9B:

The search may be exhaustive, with all possible combinations tried. This can be significantly speeded up using a "smart tree" search. The main advantage of a smart tree is that it reduces the number of possible combinations which must be checked to find all the possible solutions. This is especially true where the number of content items and their combined sizes is far in excess of the size of a container. The tree 900 is illustrated in FIG. 9 of the drawings and can be formed as follow:

Let us form a tree by the following rule:
1. The root 901 of the tree 900 is the first element of the universal set U
2. Each node j ($1 \leq j \leq N$) on the tree has exactly N-j children: looking at FIG. 9 for example all the elements of the universal set located on the right of this element. So, for example if node U3 appears on this tree, then its children are $u_4, u_5 \ldots u_N$.

The smart tree search is first performed using a depth first search strategy accumulating the total length of a combination starting from the root of the tree. As soon as the total length exceeds the length of the container the rest of the down branch is chopped. This is repeated for all parts of the tree, starting at the root and all its immediate children. The solutions that fit are then kept.

Once the first set of solutions has been produced, the processor checks 310 to see if all containers have been fitted. If not it selects the next container 311 and repeats the search to generate a second set of solutions for the second container, a third set for the third container and a fourth set for the fourth container. This continues until solution sets are produced for all the containers defined by the content layout.

At the end of the search, M sets of possible solutions will have been generated. Each solution in a set will comprise a one dimensional matrix or linear array of binary data having a length equal to the number of content portions N in the available set U of content portions.

In a second stage, the processor references 312 the solution sets against one another to determine 314 an allowable set of solutions for all the containers. The allowable set will comprise one solution for each container and there must be no duplication of content portions across the containers in a personalised document.

Figure 7:
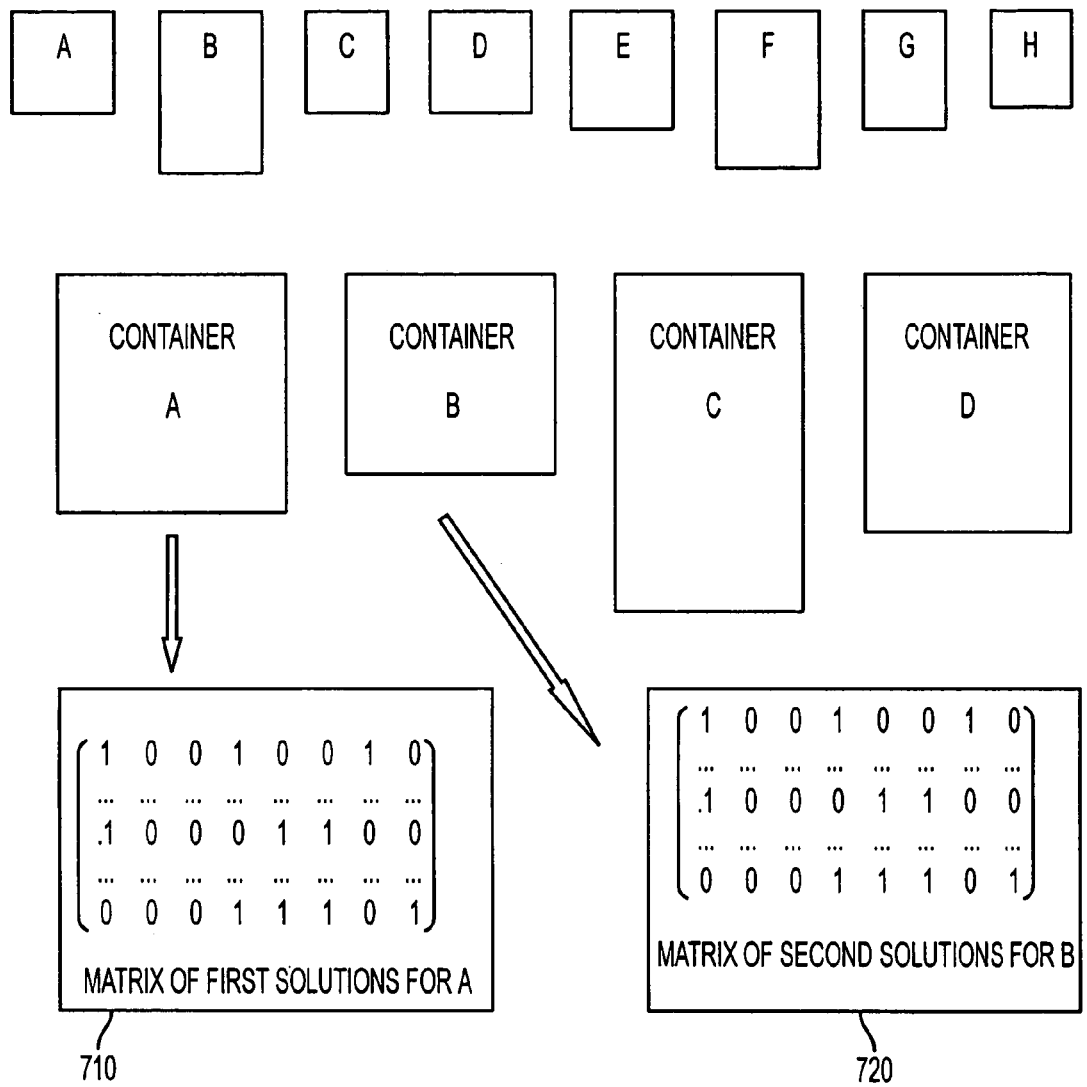
FIG. 7 is a conceptual illustration of the formation of matrices from the binary solutions for two containers.

To do this the solution sets—four in this example—are fitted to four respective matrices. Each matrix will comprise as many rows as there are solutions in the set for a particular container. The matrices so produced will each have N columns where N is the number of available content portions from which selections are made. FIG. 7 shows conceptually how two matrices 710 and 720 are generated for two containers referenced A and B. Similar matrices will be produced for containers C and D.

Figure 8:
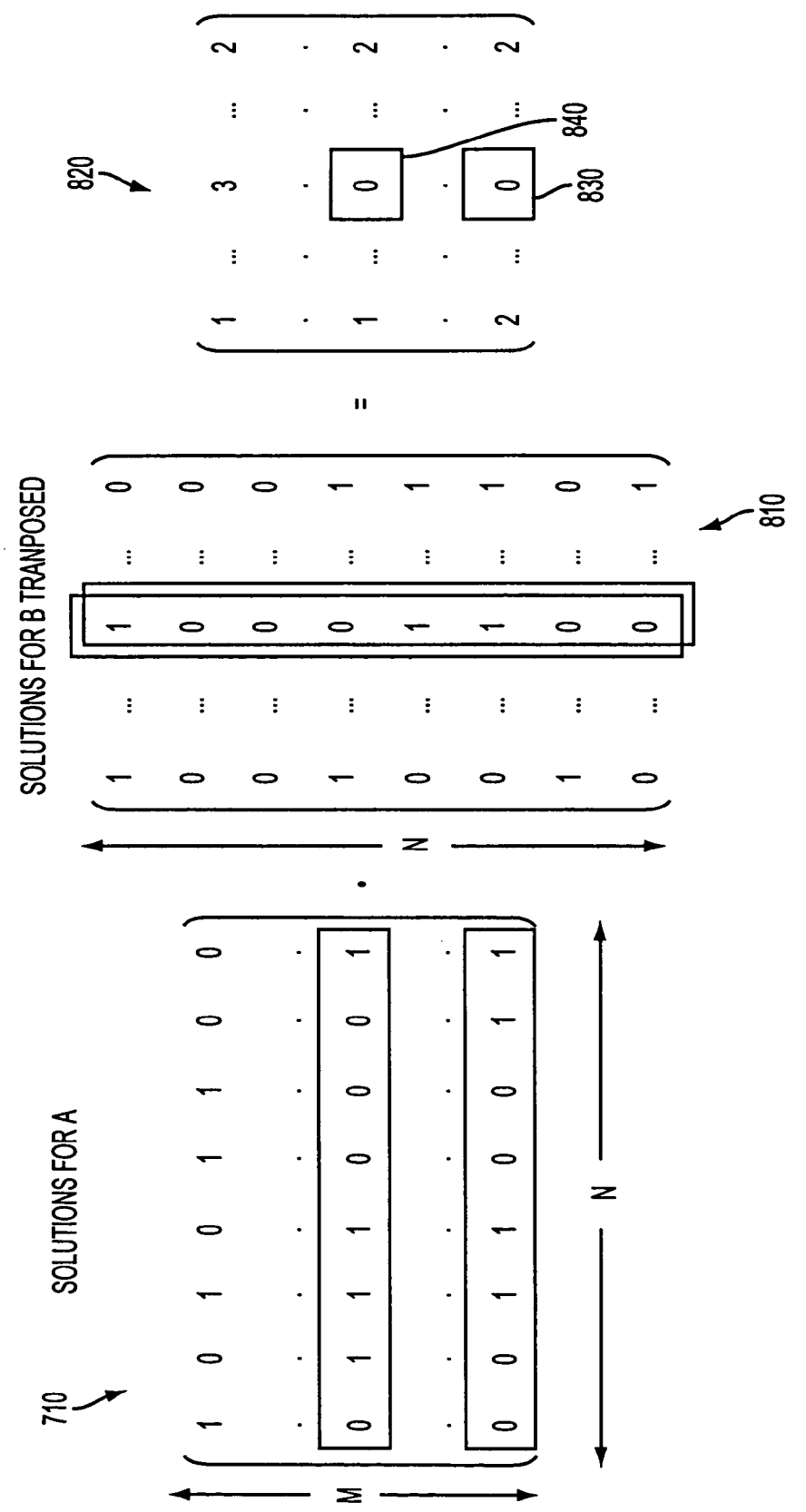
FIG. 8 is an illustration of the formation of a matrix product from one matrix and the transpose of another matrix defining solution sets.

In the next step, as illustrated in FIG. 8 a first pair of matrices 710, 720 are then selected, say those for the first and second solution sets. One of these is transposed to form transpose matrix 810 and the matrix product 820 of the transposed and remaining matrix is determined. If allowable combinations of first and second solutions are present then a corresponding zero element will be present in the matrix product (in shorthand this may be thought of as comparing elements/portions of two combinations to check if they share one or more common elements). The location of these zeros identifies the allowable combination. More than one allowable combination may be present or maybe none. In the example, two zeros 830,840 are present.

A new-accumulative-matrix is then formed in which each row comprises a set of N binary values. A binary one is entered if a content portion is present in either of the two solutions making an allowable combination. A zero is entered otherwise. The number of rows is equal to the number of zero elements in the matrix product.

The third matrix (solutions for container c) is then transposed and the product of the new matrix and the transposed third matrix is determined. The result of this step is used to determine a further new matrix as before, and the product of this further matrix is multiplied by a transpose of the fourth matrix (solutions for container d).

Finally, any zeros in the result of the last product identify allowable combinations for all four containers. If no zeros are present in the final product it may be assumed that no allowable combination can be made.

Figure 10:
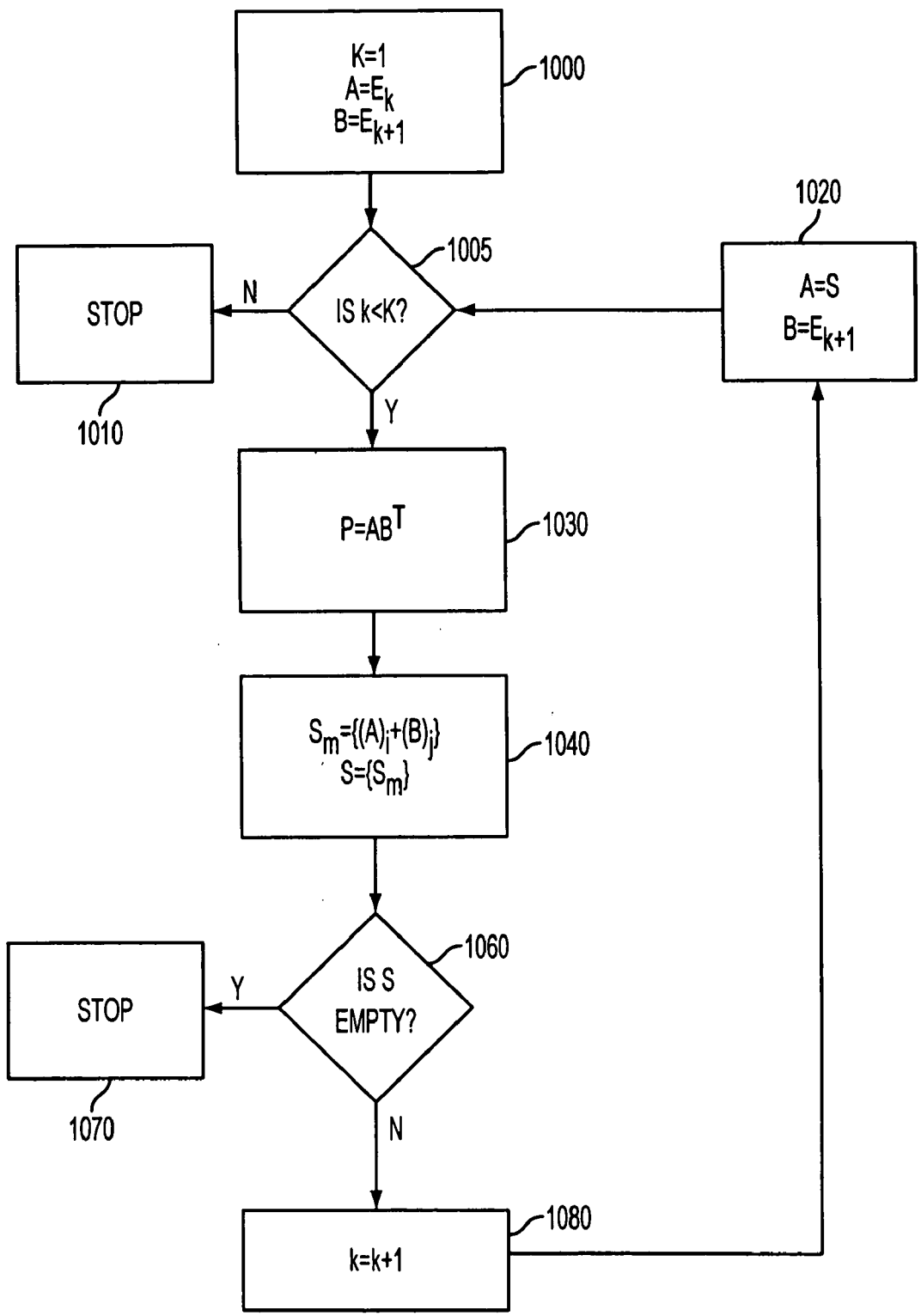
FIG. 10 sets out the steps used to determine the allowable solutions one the solution sets have been produced.

The process of generating the matrices and finding the allowable solutions can be generalised for the case of K containers and N content portions as shown in FIG. 10 of the accompanying drawings. For each container k let us define a matrix $E_k$, having N columns, where each column represents a content portion of the universal set of content portions and each row is a solution $S_i$ for container k. Matrix element is equal to 1 if correspondent content portion of the universal set belongs to the correspondent solution or equals 0 otherwise.

We have K matrices $E_1 \ldots E_K$ where K is the number of containers in the document. To select all simultaneous solutions without repetition the following repetitious procedure is applied:

Step 1000. Set k equal to 1, matrix A equal to $E_k$, matrix B equal to $E_{k+1}$.

Step 1005. Check if k is smaller than K, if not stop 1010.

Step 1020. If k>1 then set matrix A equal to S, matrix B equal to $E_{k+1}$. (from step 1080).

Step 1030. Multiply matrix A by matrix $B^T$, where $B^T$ is the transposition of B. Set P equal to this product.

Step 1040. For every zero (i,j)—element of P create a new string s of the length N as sum of the i-row of the matrix A and j-row of matrix B.

Step 1050. Form a new matrix S using such strings s as its rows.

Step 1060. If S is empty—STOP 1070: there is no allowable solution.

Step 1080. Let k=k+1. Then go back to step 1020.

Having referenced the solutions for all the containers defined by the layout a check is made to see if there are any allowable solutions. If so a document according to the allowable solution is offered and the method ends. If not, a new document layout is selected and the method steps 304 to 314 are repeated. The new layout may be generated randomly or may be a selection made from a set of a possible layouts that are previously accepted by a user.

If this still yields no allowable solution the user may be prompted to alter the content portions either by altering the content portions or the containers or both.

The invention claimed is:

1. A method of composing a document comprising:
defining a plurality of content portions to be fitted to the document;
defining a content layout for the document, which defines at least two containers into which content portions are to be fitted;
generating a first set of solutions for a first one of the containers, each solution of the first set of solutions comprising a combination of content, which fit within the container in accordance with one or more rules;
generating a second set of solutions for a second one of the containers, each solution of the second set of solutions comprising a combination of content which fit within the second container in accordance with one or more rules;
referencing the first set with the second set to determine an allowable combination of solutions which fit the first and second containers in which all of the contents in the solution for the first container differ from the contents in the solution for the second container, wherein the generating the first set of solutions and the second set of solutions comprises generating solutions which comprise an array of binary data, an entry in the array corresponding to each of the content portions in the predefined selection of content portions and each having a first value if the corresponding content portion is present in the solution and a second value if the corresponding content portion is not present within the solution represented by the array; and
composing the document based on the determined allowable combination of solutions.

2. The method of claim 1 which includes a step of selecting an alternative content layout in the event that the content does not form an allowable solution.

3. The method of claim 1 which comprises selecting a content layout and/or content portions from a predefined selection.

4. The method of claim 1 which comprises determining all possible combinations of content portions from a predefined set of content portions which satisfy the one or more rules for filling the first container.

5. The method of claim 1 which comprises generating a solution of the first solution set by:
(a) selecting a first content portion from the predefined selection;
(b) checking that the content portion satisfies the rule or rules associated with the first container;
(c) adding the content portion to a temporary solution set; and
repeating steps (a) and (b) by selecting a different content portion from the predefined set and continuing to add them to the temporary solution set until the container is full.

6. The method of claim 1 which applies a depth first search strategy to select all the possible solutions for the container.

7. The method of claim 1 which comprises:
storing the content layout and the document in a first area of machine readable memory accessible to a processor;
causing the processor to access the content portions and the content layout from the memory so as to generate the first and second solution sets; and
storing the generated solution sets in a second area of machine readable memory.

8. The method of claim 7 which further comprises causing the processor to access the stored solutions from the second area of memory and process the solutions to determine the allowable solutions before writing the allowable solutions to a third area of machine readable memory.

9. The method of claim 1 which includes the step of referencing the first solution set with the second solution set by performing a logical bitwise AND operation on the binary data defining each possible combination of first and second solutions and identifying combinations in which the result of the logical bitwise AND operation is zero.

10. The method of claim 1 in which the step of performing the logical bitwise AND operation comprises:
generating a matrix for the first set of solutions, each row in the matrix corresponding to a different solution from the first solution set and each column corresponding to one of the possible content portions;
generating a matrix for the second solutions, each row in the matrix corresponding to a different solution from the second solution set and each column corresponding to one of the possible content portions;
transposing one of the matrices; and
determining the matrix product, allowable combinations then being apparent from the values of the elements in the matrix product.

11. The method of claim 10 in which more than two containers are defined by the content layout, further comprising:

producing a one dimensional matrix for every allowable combination identified by the matrix product in which each entry in the one dimensional matrix comprises a binary value which corresponds to one of the content portions in the predetermined selection, with a first binary value being assigned if a content portion is used in the allowable combination and a second value if it is still free for use;

fitting the one dimensional matrices to a new two dimensional matrix; and processing this new matrix with a matrix for the third solution set.

12. A computer readable medium having a computer program thereon which when running on a processor causes the processor to perform the method of claim 1.

13. Apparatus for the composition of a page of a document by fitting a selection of content portions into the document comprising:

a content layout generator for the generation of a content layout including at least two containers to which content portions are to be fitted;

a solution set generator arranged to generate a first set of solutions for the first container, each solution comprising a combination of content portions which fit within the first container in accordance with one or more rules, and a second set of solutions for the second container, each solution comprising a combination of content portions which fit within the container in accordance with one or more rules; and a referencer arranged to reference the first set with the second set to determine an allowable combination of solutions for the first and second containers in which all of the content portions in the solution for the first container of the allowable combination differ from the content portions in the solution for the second container, wherein the solution set generator is arranged to generate the first set of solutions and the second set of solutions by generating solutions which comprise an array of binary data, an entry in the array corresponding to each of the content portions in the predefined selection of content portions and each having a first value if the corresponding content portion is present in the solution and a second value if the corresponding patent portion is not present within the solution represented by the array; and a composer arranged to compose the page of the document based on the determined allowable combination of solutions.

14. Computer according to claim 13 in which the solution set generator and the referencer are embodied by a processing means.

* * * * *